US009420004B2

(12) United States Patent
Palshikar et al.

(10) Patent No.: US 9,420,004 B2
(45) Date of Patent: Aug. 16, 2016

(54) DYNAMIC EXPRESSION EVALUATION BASED GROUPING OF VM OBJECTS FOR NETWORKING AND SECURITY SERVICES IN A VIRTUALIZED COMPUTING SYSTEM

(71) Applicant: VMWARE, INC., Palo Alto, CA (US)

(72) Inventors: Amol Palshikar, Pune (IN); Sachin Mohan Vaidya, Pune (IN); Prayas Gaurav, Pune (IN); Nikhil Bokare, Pune (IN)

(73) Assignee: VMware, Inc., Palo Alto, CA (US)

( * ) Notice: Subject to any disclaimer, the term of this patent is extended or adjusted under 35 U.S.C. 154(b) by 211 days.

(21) Appl. No.: 14/220,185

(22) Filed: Mar. 20, 2014

(65) Prior Publication Data

US 2015/0150087 A1    May 28, 2015

(30) Foreign Application Priority Data

Nov. 27, 2013   (IN) ........................... 5467/CHE/2013

(51) Int. Cl.
    *H04L 29/06*      (2006.01)
    *G06F 9/455*      (2006.01)

(52) U.S. Cl.
    CPC ............ *H04L 63/20* (2013.01); *G06F 9/45558* (2013.01); *G06F 2009/45587* (2013.01); *G06F 2009/45595* (2013.01)

(58) Field of Classification Search
    CPC ................ H04L 63/20; G06F 9/45558; G06F 2009/45595; G06F 2009/45587
    See application file for complete search history.

(56) References Cited

U.S. PATENT DOCUMENTS

| | | | | |
|---|---|---|---|---|
| 2006/0005227 A1* | 1/2006 | Samuelsson | ........ | G06F 21/6218 726/1 |
| 2008/0104708 A1* | 5/2008 | Kerschbaum | ........... | G06F 21/62 726/27 |
| 2009/0288084 A1* | 11/2009 | Astete | ................. | G06F 9/45533 718/1 |
| 2010/0169800 A1* | 7/2010 | Lance | ..................... | A63F 13/12 715/757 |
| 2014/0282518 A1* | 9/2014 | Banerjee | ............. | G06F 9/45533 718/1 |
| 2014/0282889 A1* | 9/2014 | Ishaya | ..................... | H04L 63/08 726/4 |

* cited by examiner

*Primary Examiner* — Matthew Smithers

(57) ABSTRACT

Techniques for grouping virtual machine (VM) objects for networking and security services in a virtualized computing system are described. In one example embodiment, VM attributes and identity attributes are obtained from a virtual center and an identity server, respectively. One or more desired security groups are then formed based on security requirements of the virtualized computing system. A user defined dynamic expression is then associated with the one or more security groups. One or more expression attributes are then determined by evaluating the user defined dynamic expression using the obtained VM attributes and identity attributes. VM objects are then grouped based on the determined one or more expression attributes. The grouped VM objects are then associated with the created one or more security groups for providing the networking and security services.

21 Claims, 4 Drawing Sheets

DYNAMIC EXPRESSION EVALUATION BASED GROUPING OF VM OBJECTS FOR NETWORKING AND SECURITY SERVICES IN A VIRTUALIZED COMPUTING SYSTEM

RELATED APPLICATIONS

Benefit is claimed under 35 U.S.C. 119(a)-(d) to Foreign application Serial No. 5467/CHE/2013 filed in India entitled "DYNAMIC EXPRESSION EVALUATION BASED GROUPING OF VM OBJECTS FOR NETWORKING AND SECURITY SERVICES IN A VIRTUALIZED COMPUTING SYSTEM", filed on Nov. 27, 2013, by VMware, INC., which is herein incorporated in its entirety by reference for all purposes.

BACKGROUND

Typically, networking and security requirements in virtualized datacenters may vary based on workloads. For example, workloads acting as servers may require different policy configuration than workloads running test machines and/or non-production workloads.

Existing workload grouping techniques for workloads based their networking and security requirements in the virtualized datacenters are very restrictive and non-intuitive. Further, existing workload grouping techniques are based on using resource pools, datacenters, clusters, portgroups and the like, which are based on location of VMs in virtual datacenter. Generally, to address this network and system administrators end up categorizing workloads based on their policy requirements in physical or compute centric buckets for providing the desired networking and security services in the virtualized datacenters. For example, network and system administrators would end up running demilitarized zone (DMZ) host machines on a separate physical cluster than other clusters or service providers using different resource pools for different tenants and so on.

Further, such grouping techniques results in inefficient resource sharing and/or virtualization in virtualized datacenters.

DETAILED DESCRIPTION

Embodiments described herein provide grouping of VM objects for networking and security services in a virtualized datacenter. The grouping module is part of a management server, such as a server running vCenter, which is a product of VMware, Inc. The grouping module first dynamically evaluates a user defined expression using VM attributes and identity attributes to determine one or more expression attributes. The grouping module then groups VM objects in the virtual datacenter based on the determined one or more expression attributes. The grouping module then associates the grouped VM objects with the one or more security groups created by a system administrator to provide the networking and security services in the virtual datacenter.

System Overview and Examples of Operation

Figure 1:
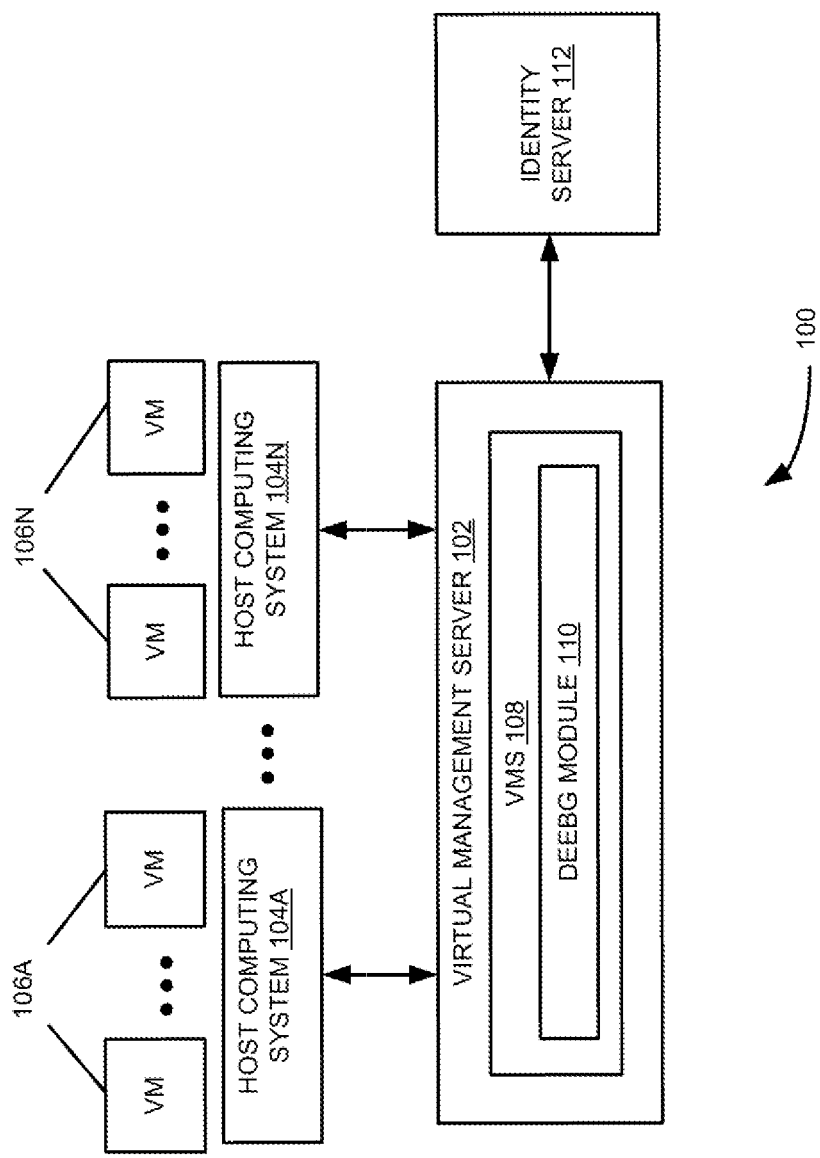
FIG. 1 is a block diagram illustrating a system for grouping for networking and security services in a virtualized computing environment, according to an example embodiment.

FIG. 1 is a block diagram illustrating system 100 for grouping networking and security services in a virtualized computing environment, according to an example embodiment. As shown in FIG. 1, system 100 includes host computing systems 104 A-N and associated virtual machines (VMs) 106 A-N hosted by host computing systems 104 A-N. Also as shown in FIG. 1, system 100 includes management server 102 that is communicatively coupled to the host computing systems 104A-N. Further as shown in FIG. 1, management server 102 includes virtualization management software (VMS) 108. Furthermore as shown in FIG. 1, VMS 108 includes dynamic expression evaluation grouping (DEEBG) module 110. In addition, system 100 includes identity server 112 communicatively connected to management server 102. In these embodiments, identity servers are external sources, such as active directory servers, that can be extended to include other sources of information and can provide other types of information. Example identity servers are systems providing User and Group related information.

In operation, DEEBG module 110 obtains virtual machine (VM) attributes and identity attributes from management server 102 and identity server 112, respectively. In some embodiments, DEEBG module 110 obtains the VM attributes from an inventory database maintained by management server 102. Example VM attributes are virtual workload parameters, operating system parameters, user configured parameters, applications running on workloads, such as database servers and Web servers and so on, and partner provided attributes for VMs. Partner may be third party networking and security enforcement engines. Example virtual workload parameters are hosts, clusters, folders, datastores, resource pools, portgroups and the like. Example operating system parameters are operating system type, hostname, central processing unit (CPU), memory type, storage type and so on. Example user configured parameters are name of VMs, tags applied to VMs, and so on. Example partner provided attributes for VMs are workloads having sensitive data, workloads including virus infected files and so on. Example identity attributes are users, groups and locations of VMs. Example groups are group memberships of user logged into VMs.

DEEBG module 110 then forms one or more desired security groups based on security requirements of the virtualized computing environment. Example security groups are SecurityGroup1, SecurityGroup2, and so on.

Further in operation, DEEBG module 110 associates a user defined dynamic expression with the one or more formed security groups. Example user defined dynamic expression are "all windows machines with sensitive data", "all machines on test network where users from finance group are logged in", "all windows machines with virus infected files not connected to the test network", and so on.

Furthermore in operation, DEEBG module 110 determines one or more expression attributes by evaluating the user defined expression using the obtained VM attributes and identity attributes. In the above user defined dynamic expression "all windows machines with virus infected files not connected to the test network" example, one or more expression attributes determined by DEEBG module 110 could include:

"(virtualMachine.operatingSystemName contains "windows") and (virtualMachine.tags contains "VIRUS_FOUND) not (portgroup.id equals "portgroup-123).

In some embodiments, one or more expression attributes are determined by evaluating the user defined expression using one or more of the obtained VM attributes and/or identity attributes to provide an enhanced number of workload classifications.

DEEBG module 110 then groups VM objects based on the determined one or more expression attributes. In some embodiments, expression attributes are evaluated using set theory, where each of the above determined example one or more expression attributes are converted into a set of VM objects. In these embodiments, VM objects are translated entities. Example translated VM entities are Internet Protocol (IP) addresses and media access control (MAC) addresses and so on. For example, a firewall security enforcement engine queries for IP addresses from the security group, an antivirus security enforcement engine may query for VM ids from the security group and so on. In these embodiments, IP addresses, MAC addresses, and machine identifiers are generated from each grouped VMs.

Example groups of VM objects are:
  Group 1=list of VMs who's name contains the word "windows".
  Group 2=list of VMs where a partner has applied "VIRUS_FOUND" tag.
  Group 3=list of VMs which have one or more network interface connected to port group "portgroup 123".

DEEBG module 110 then associates the grouped VM objects with the created one or more security groups to provide the networking and security services in the virtualized computing environment.

In addition in operation, DEEBG module 110 determines any change in application information and/or security posture in the at least one of the security groups. DEEBG module 110 then reevaluates the security groups when a user logs into a VM in the at least one of user groups if there is any change in the application information and/or security posture. DEEBG module 110 then notifies the change in VM objects to a security enforcement engine via the associated at least one of the security groups. DEEBG module 110 repeats determining change in the application information and/or security posture in the at least one of the security groups.

Also, although certain terms are used primarily herein, other terms could be used interchangeably to yield equivalent embodiments and examples. For example, the term "physical computing system" may be used interchangeably with "physical machine" or "physical device". Further for example, it is well-known that equivalent terms in the field of system virtualization or similar or related fields could be substituted for such terms as "physical computer," "hypervisor," "virtual machine," or the like. Further, the terms "virtual computing environment" and "virtual datacenter" are used interchangeably throughout the document Numerous specific details are set forth herein, such as data formats and code sequences and the like, in order to provide a thorough understanding of the described techniques. The embodiments described also can be practiced without some of the specific details described herein, or with other specific details, such as changes with respect to the ordering of the logic, different logic, different architectures, or the like. Thus, the scope of the techniques and/or functions described is not limited by the particular order, selection, or decomposition of aspects described with reference to any particular routine, module, component, or the like.

Example Processes

Figure 2:
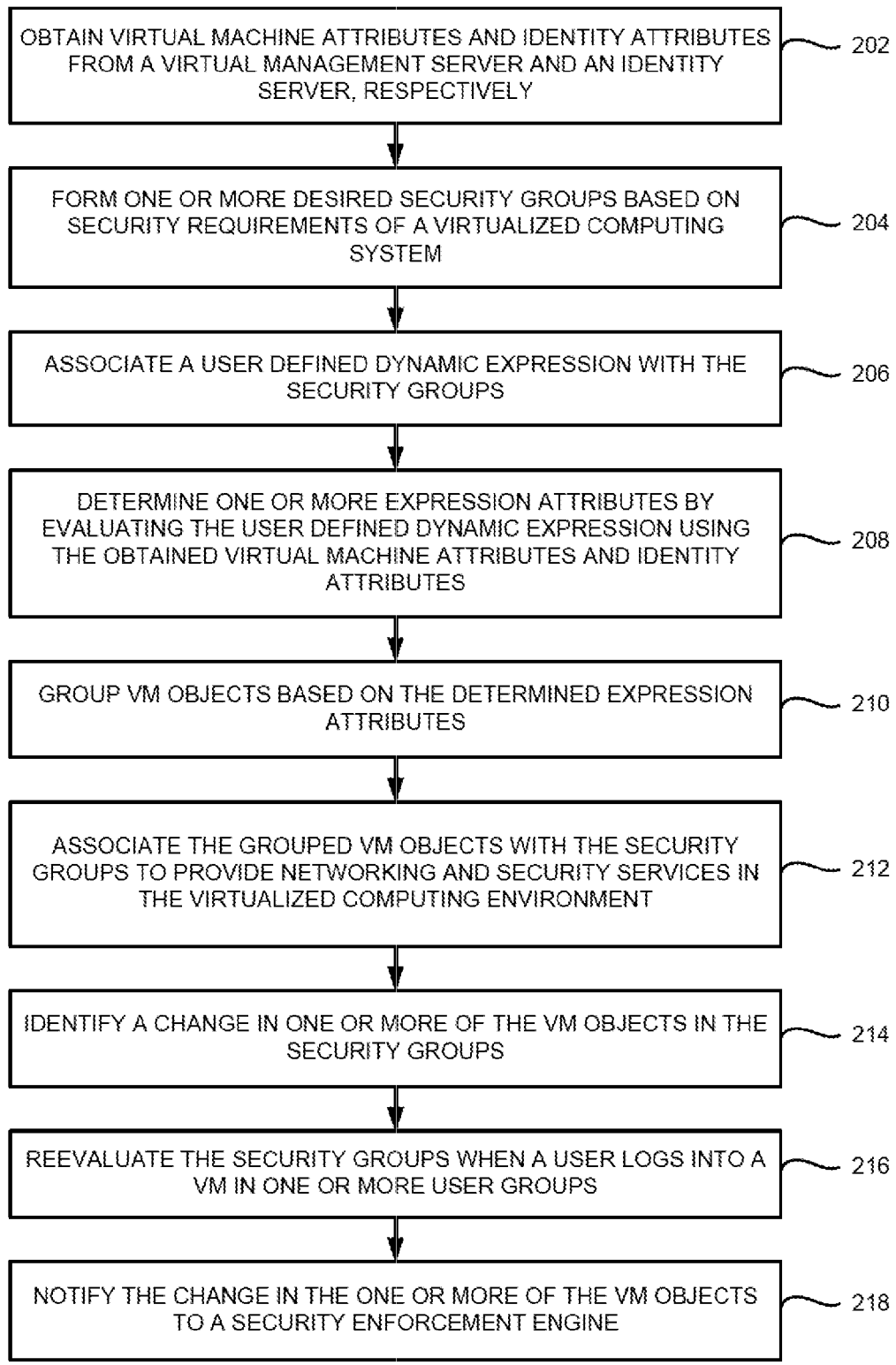
FIG. 2 is a flow diagram of process for grouping for networking and security services in a virtualized computing environment, according to an example embodiment.

FIG. 2 is a flow diagram of process 200, for grouping VM objects for networking and security services in a virtualized computing environment, according to an example embodiment. FIG. 2 illustrate grouping of VM objects for networking and security services that may be performed by, for example, one or more modules of DEEBG module residing in management server described above.

At block 202, process 200 is configured to obtain virtual machine attributes and identify attributes from a management server. At block 204, process 200 is configured to form at least one of desired security groups based on security requirements of the virtualized computing environment. At block 206, a user defined dynamic expression with the security groups is assigned. At block 208, process 200 is configured to determine one or more expressions attributes by evaluating the user defined dynamic expression using the obtained virtual machine attributes and the identity attributes.

At block 210. VM objects are grouped based on the determined at least one of the expression attributes. In some embodiments, VM objects are grouped using set theory to convert the determined at least one of the expression attributes. At block 212, the grouped VM objects are associated with the created at least one of the security groups to provide the networking and security services in the virtualized computing environment. In these embodiments, VM objects are translated entities and translated entities include generated IP addresses, MAC addresses and/or machine identifiers.

At block 214, a change in application information and/or security posture in at least one of VMs in the at least one of the security groups is determined. At block 216, based on the outcome of the determination at block 214, security groups are reevaluated if there is any change in the application information and/or security posture in at least one of VMs in the at least one of the security groups. At block 218, the change in VM objects to a security enforcement engines is notified via the associated at least one of the security groups. In these embodiments, based on the outcome of the determination at block 214, determination of any change in the application information and/or security posture in at least one of VMs in the at least one of the security groups is repeated if there no change in the application information and/or security posture in at least one of VMs in the at least one of the security groups.

Figure 3:
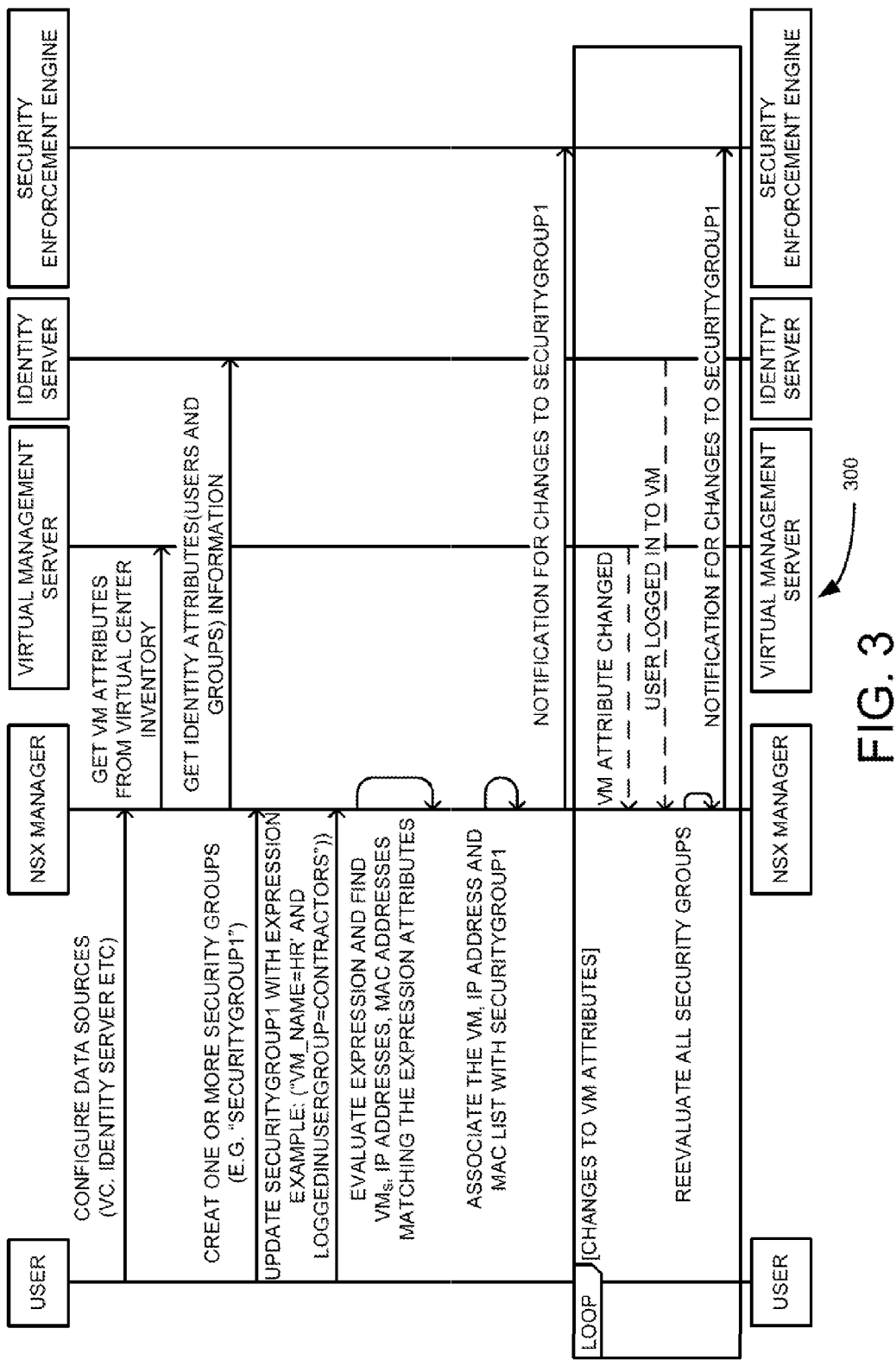
FIG. 3 is a timing diagram illustrating sequence of events taking place for grouping for networking and security services in a virtualized computing system.

Process 200 for grouping for networking and security services in a virtualized computing environment is explained in more detail above with reference to the system diagram 100 shown in FIG. 1 and the timing diagram 300 shown in FIG. 3.

Example Computing System Implementation

Figure 4:
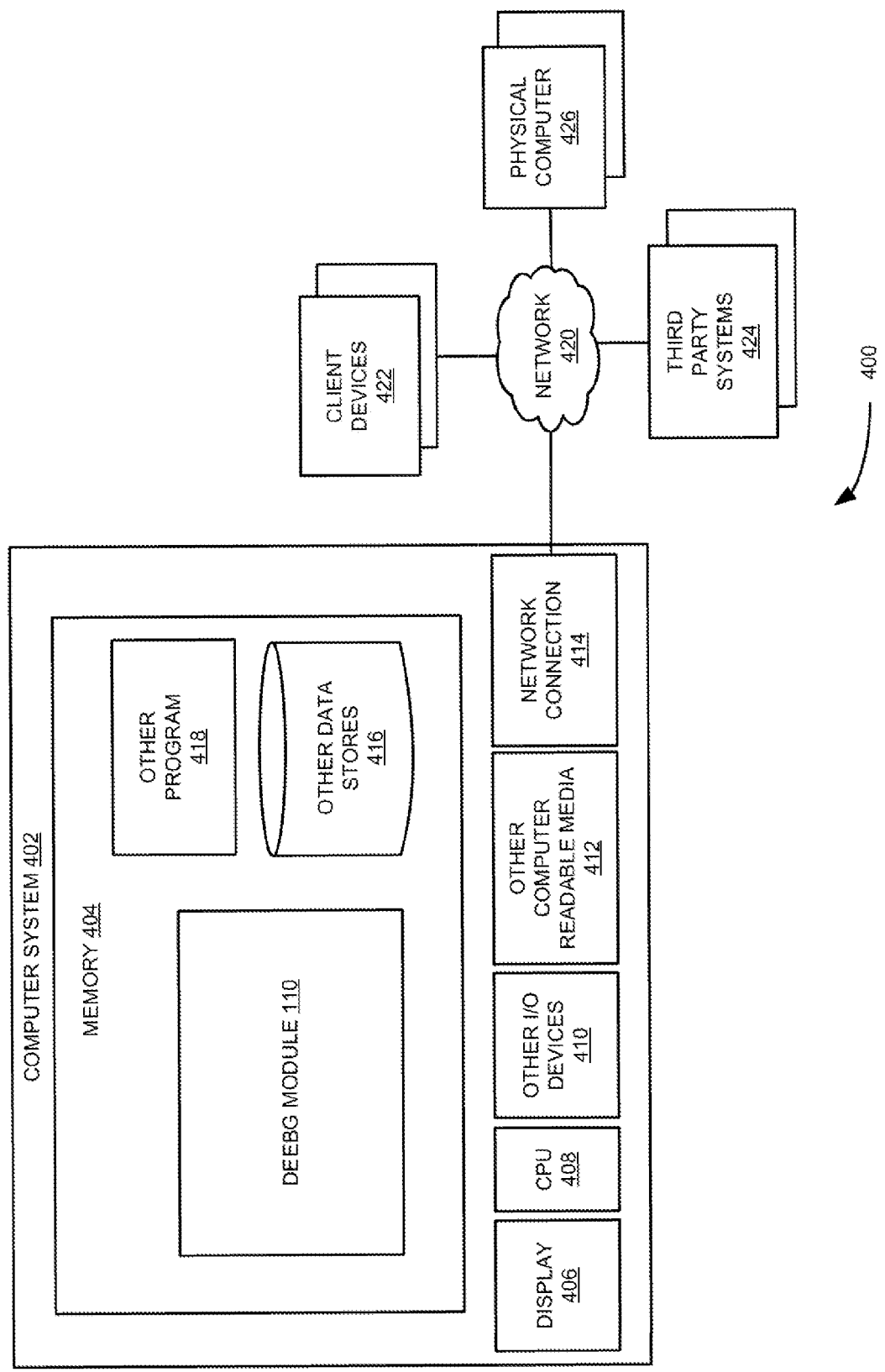
FIG. 4 is a block diagram of a computing system for grouping for networking and security services in a virtualized computing environment, according to an example embodiment.

FIG. 4 is block diagram 400 of an example computing system for grouping for networking and security services in a virtualized computing environment, according to an example embodiment. In particular, FIG. 4 shows computing system 402 that may be utilized to implement grouping module (e.g., dynamic expression evaluation based grouping (DEEBG) module shown in FIG. 1). DEEBG module 110 may be implemented in software, hardware, firmware, or in some combination to achieve the capabilities described herein.

In the embodiment shown, computing system 302 may comprise computer memory ("memory") 404, display 406, one or more central processing units ("CPU") 408, Input/Output devices 410 (e.g., a keyboard, a mouse, etc.), other computer-readable media 412, and network connections 414. DEEBG module 110 is shown residing in memory 404. The components of DEEBG module 110 may execute on one or more CPUs 408 and implement techniques described herein. Other code or programs 418 (e.g., an administrative interface, a Web server, and the like) and potentially other data repositories, such as data store 416, may also reside in memory 404, and execute on one or more CPUs 408. One or more of the components in FIG. 4 may not be present in any specific implementation. For example, some embodiments may not provide other computer readable media 412 or display 406.

DEEBG module 110 interacts via network 420 with client devices 422, physical computers 426, and/or third-party systems/applications 424. The third-party systems/applications 455 may include any systems that provide data to, or utilize data from, DEEBG 110, including remote management/monitoring consoles, performance profilers, activity trackers, or the like.

As discussed, DEEBG module 110 provides dynamic expression evaluation based grouping of VM objects for networking and security services in a virtualized computing environment.

The architecture shown in FIG. 4 may in some embodiments be partially or fully virtualized. For example, computer system 402 may be one or possibly many VMs executing on physical hardware and managed by a hypervisor, VM monitor, or similar technology. Also, physical computers 426 may include virtualization logic to manage multiple VMs.

In an example embodiment, components/modules of DEEBG module 110 are implemented using standard programming techniques. In other embodiments, DEEBH module 110 may be implemented as instructions processed by a VM that executes as one of other programs 418.

Furthermore, in some embodiments, some or all of the components of DEEBG module 110 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques.

Further, from the foregoing it will be appreciated that, although specific embodiments have been described herein for purposes of illustration, various modifications may be made without deviating from the spirit and scope of this disclosure. For example, the methods, techniques, and systems for grouping of VM objects for networking and security services in a virtualized datacenter are applicable to other architectures or in other settings. For example, the described techniques may be employed as part of a cloud-based computing resource offering, wherein customers may pay to have higher importance levels associated with their activities, in order to obtain higher levels of service or availability. As another example, the described techniques may be employed to allocate resources or schedule CPU time at the process level within an operating system. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method of grouping of virtual machine (VM) objects for networking and security services in a virtualized computing environment, the method comprising:
    obtaining VM attributes and identity attributes from a management server and an identity server, respectively;
    forming at least one of desired security groups based on security requirements of the virtualized computing environment;
    associating a user defined dynamic expression with the at least one the security groups;
    determining at least one of expression attributes by evaluating the user defined dynamic expression using the obtained VM attributes and identity attributes;
    grouping VM objects based on the determined at least one of the expression attributes; and
    associating the grouped VM objects with the created at least one of the security groups to provide the networking and security services in the virtualized computing environment.

2. The method of claim 1, wherein the VM attributes are selected from the group consisting of virtual workload parameters, operating system parameters, user configured parameters, applications running inside workloads, and partner provided attributes for VMs.

3. The method of claim 1, wherein the identity attributes are selected from the group consisting of users, groups, and locations.

4. The method of claim 1, wherein VM objects are translated entities, wherein translated entities include generating IP addresses, MAC addresses and/or machine identifiers from each grouped VMs.

5. The method of claim 1, wherein grouping VM objects based on the determined at least one of the expression attributes, comprises:
    grouping VM objects using set theory to convert the determined at least one of the expression attributes.

6. The method of claim 1, further comprising:
    Determining whether there is a change in application information and/or security posture in at least one of VMs in the at least one of the security groups;
    if so, reevaluating the security groups; and
    notifying the change in VM objects to a security enforcement engine via the associated at least one of the security groups.

7. The method of claim 6, further comprising:
    if not, repeating the step of determining whether there is any change in the application information and/or security posture.

8. A non-transitory computer-readable storage medium including instructions that are configured, when executed by a computing system, to perform a method for grouping VM objects for networking and security services in a virtualized computing system, the method comprising:
    obtaining VM attributes and identity attributes from a virtual center and an identity server, respectively:
    forming at least one of desired security groups based on security requirements of the virtualized computing system;
    associating a user defined dynamic expression with the at least one of the security groups;
    evaluating the user defined dynamic expression using the obtained VM attributes and identity attributes to determine at least one of expression attributes;

grouping VM objects based on the determined at least one of the expression attributes; and associating the grouped VM objects with the created at least one of the security groups.

9. The non-transitory computer-readable storage medium of claim 8, wherein the VM attributes are selected from the group consisting of virtual workload parameters, operating system parameters, user configured parameters, applications running inside workloads, and partner provided attributes for VMs.

10. The non-transitory computer-readable storage medium of claim 8, wherein the identity attributes are selected from the group consisting of users, groups, and locations.

11. The non-transitory computer-readable storage medium of claim 8, wherein VM objects are translated entities, wherein translated entities include generating IP addresses, MAC addresses and/or machine identifiers from each grouped VMs.

12. The non-transitory computer-readable storage medium of claim 8, wherein grouping VM objects based on the determined at least one of the expression attributes, comprises:

grouping VM objects using set theory to convert the determined at least one of the expression attributes.

13. The non-transitory computer-readable storage medium of claim 8, further comprising:

Determining whether there is a change in application information and/or security posture in at least one of VMs in the at least one of the security groups;

if so, reevaluating the security groups; and notifying the change in VM objects to a security enforcement engine via the associated at least one of the security groups.

14. The non-transitory computer-readable storage medium of claim 13, further comprising:

if not, repeating the step of determining whether there is any change in the application information and/or security posture.

15. A computing system for grouping VM objects for networking and security in a virtualized computing system, the system comprising:

multiple host computing systems, wherein each host computing system hosting multiple VMs;

a management server communicatively coupled to the multiple host computing systems, wherein the management server comprising virtualization management software (VMS), and wherein the VMS includes a grouping module, and that is configured to:

obtain VM attributes and identity attributes from a virtual center and an identity server, respectively:

format least one of desired security groups based on security requirements of the virtualized computing system;

associate a user defined dynamic expression with the at least one of the security groups;

evaluate the user defined dynamic expression using the obtained VM attributes and identity attributes to determine at least one of expression attributes;

grouping VM objects based on the determined at least one of the expression attributes; and associate the grouped VM objects with the created at least one of the security groups.

16. The computing system of claim 15, wherein the VM attributes are selected from the group consisting of virtual workload parameters, operating system parameters, user configured parameters, applications running inside workloads, and partner provided attributes for VMs.

17. The system of claim 15, wherein the identity attributes are selected from the group consisting of users, groups, and locations.

18. The system of claim 15, wherein VM objects are translated entities, wherein translated entities include generated IP addresses, MAC addresses and/or machine identifiers from each grouped VMs.

19. The system of claim 15, wherein grouping MM objects based on the determined at least one of the expression attributes, is configured to:

group VM objects using set theory to convert the determined at least of the expression attributes.

20. The system of claim 15, further configured to:

Determine whether there is a change in application information and/or security posture in at least one of VMs in the at least one of the security groups;

if so, reevaluate the security groups; and notify the change in VM objects to a security enforcement engine via the associated at least one of the security groups.

21. The system of claim 20, further configured to:

if not, repeat the step of determining whether there is any change in the application information and/or security posture.

\* \* \* \* \*